R. R. BOLT.
NUT LOCK.
APPLICATION FILED OCT. 25, 1916.
1,270,108.
Patented June 18, 1918.
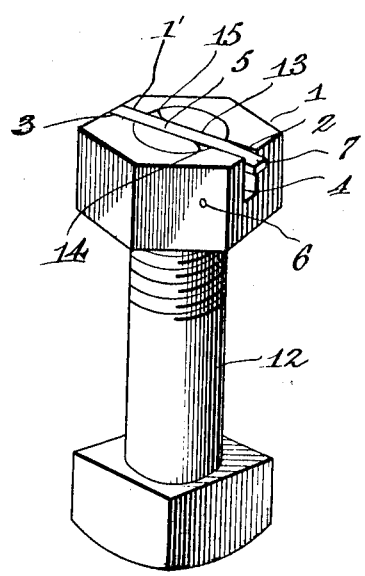
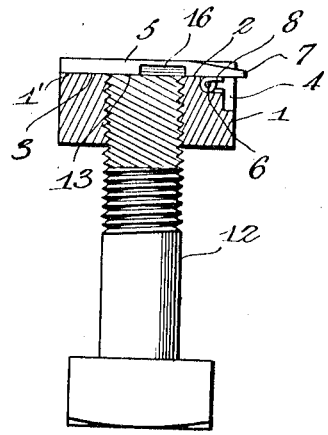
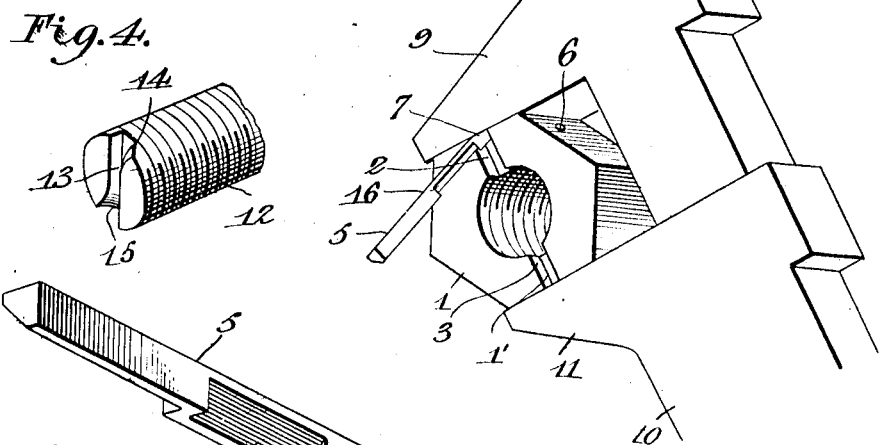
Witness
Frederick W. Ely
Inventor
Rufus R. Bolt.
By Victor J. Evans
Attorney

UNITED STATES PATENT OFFICE.

RUFUS R. BOLT, OF CANTON, OHIO.

NUT-LOCK.

1,270,108.

Specification of Letters Patent.

Patented June 18, 1918.

Application filed October 25, 1916. Serial No. 127,649.

*To all whom it may concern:*

Be it known that I, RUFUS R. BOLT, a citizen of the United States, residing at Canton, in the county of Stark and State of Ohio, have invented new and useful Improvements in Nut-Locks, of which the following is a specification.

This invention relates to improvements in means for locking a nut upon a bolt.

In carrying out my invention it is my purpose to provide an ordinary nut with a transverse kerf or pocket upon its outer face and to pivot within one of the kerfs a spring pressed locking member which straddles the bore of the nut and is normally received in the second kerf, the said locking member being provided with a tail piece extending beyond the nut whereby to receive one of the jaws of the wrench so that the locking member when so engaged will be retained out against one of the sides of the nut and out of position to engage with the longitudinal slot in the end of the bolt upon which the nut is adapted to be screwed.

It is a further object of the invention to provide a nut with a spring pressed locking dog that is adapted to be normally arranged transversely over the bore of the nut upon the outer face thereof, to bevel one of the sides of said locking member and to provide the bolt upon which the nut is adapted to be screwed with a longitudinal groove or slot to receive the locking member of the nut, two of the diametrically opposite corners of the walls of the slot of the bolt being beveled to engage with the beveled surface of the locking member whereby the bolt may be screwed for a certain distance upon the nut after the locking member engages with the groove of the bolt, the locking member when contacting with the referred to angular corners ratcheting over the same and thus preventing a further homeward screwing of the nut upon the bolt.

With the above and other objects in view the improvement resides in the construction, combination and arrangement of parts set forth in the following specification and falling within the scope of the appended claim.

In the drawing:

Figure 1 is a perspective view illustrating a nut and bolt locked in accordance with the present invention, Fig. 2 is a similar view illustrating the position of the locking member when the nut is engaged by a wrench, Fig. 3 is a sectional view taken in a line with the locking member of the nut, as illustrated in Fig. 1, Fig. 4 is a perspective view of the end of the shank of the bolt, and Fig. 5 is a similar view of the locking member for the nut.

As disclosed by the drawing, the nut 1 is of the ordinary construction, but the same has its outer face provided with a transverse kerf or groove 1′ which, of course, straddles the bore of the nut and so divides the same into two alining channels 2 and 3 respectively. The outer side of the nut 1 in a line with the channel 2 is provided with a depression 4.

The numeral 5 designates a locking bar which is pivoted between the walls of the channel 2, as indicated by the numeral 6, the said bar being provided with an outwardly extending tail piece 7 and the locking member or bar is normally swung over the bore of the nut to have its ends received in the channel 3 through the medium of a spring 8 which is received in a suitable pocket provided outwardly of the pivot and in the lower wall of the channel 8.

As illustrated in Fig. 2 of the drawing, the tail 7 of the locking bar 5 is arranged to be engaged by one of the jaws 9 of the wrench 10, the other jaw 11 engaging the side of the nut opposite that over which the tail of the locking bar is extended, and when so engaged it will be noted that the tail of the said locking bar will be forced into the groove 4 so that the nut can be readily threaded upon the bolt 12. The bolt to be engaged by the nut has its shank from its outer end provided with a longitudinal slot or kerf 13, and the opposite walls provided by the said groove or kerf at the diametrically opposite corners thereof are inclined or beveled outwardly, as at 14 and 15 respectively. The locking bar 5 from its lower edge is beveled to one of its sides from its lower edge to its opposite sides as indicated by the numeral 16 and by this arrangement it will be noted that when the beveled faces of the said locking bar contact with the beveled corners of the nut, the same will ratchet over the said beveled corners permitting the nut being screwed homewardly upon the bolt without necessitating the swinging of the locking bar outward of the nut.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

In a device for the purpose set forth, the combination, a bolt having its shank grooved longitudinally from its outer end, two of the diagonally opposite corners provided by the walls of the groove being beveled outwardly, a nut for the bolt, said nut having its outer face channeled, a locking bar pivoted within the channel adjacent one of the sides of the nut, said bar having a tail portion extending outwardly of its pivot beyond the side of the nut, said nut below the tail being grooved to receive the said tail, and the locking bar being beveled in opposite directions from the center of its inner edge to its outer edge whereby to present two oppositely inclined surfaces arranged in the path of engagement with and corresponding to the angles of the beveled corners at the diagonally opposite ends of the groove in the bolt.

In testimony whereof I affix my signature.

RUFUS R. BOLT.

Copies of this patent may be obtained for five cents each, by addressing the "Commissioner of Patents. Washington, D. C."